J. P. Manny,
Harvester Cutter.
No. 17,745.  Patented July 7, 1857.
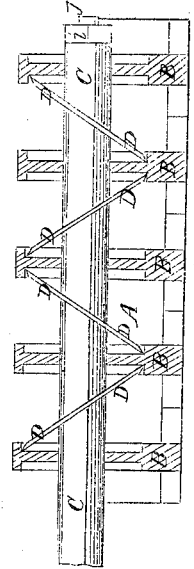
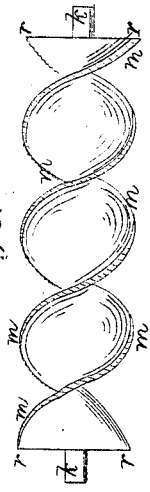
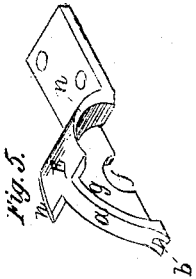
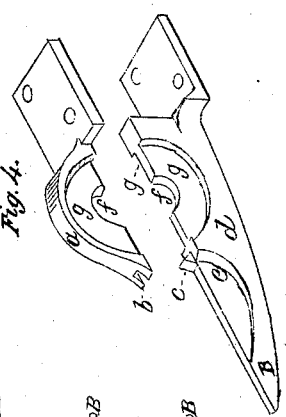
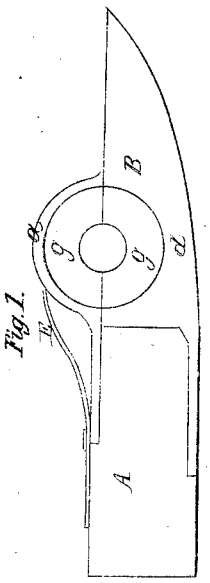
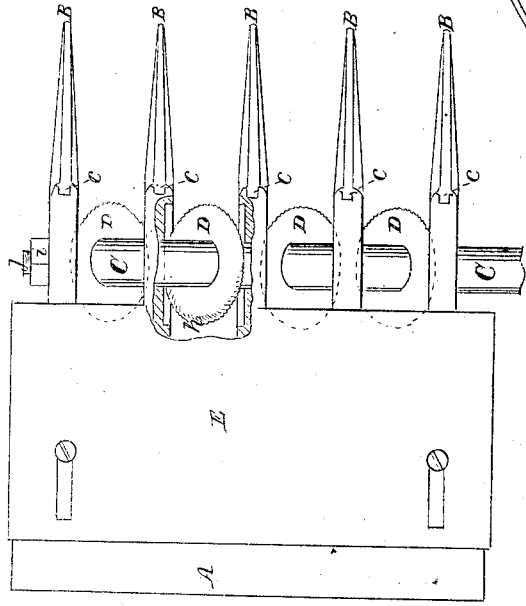

UNITED STATES PATENT OFFICE.

JOHN P. MANNY, ROCKFORD, ILLINOIS.

IMPROVED CUTTING APPARATUS FOR HARVESTERS.

Specification forming part of Letters Patent No. 17,745, dated July 7, 1857.

*To all whom it may concern:*

Be it known that I, JOHN P. MANNY, of Rockford, in the county of Winnebago and State of Illinois, have invented certain new and useful Improvements in the Cutting Apparatus of Harvesting-Machines; and I do hereby declare the following to be a full, clear, and exact description of the construction and operation of the same, reference being had to the accompanying drawings, making a part of this specification, in which—

Figure 1 represents a side elevation of one of the fingers and cap. Fig. 2 represents a top plan of the cutters and fingers, a portion being broken away and represented in section-lines to better show the cutters underneath. Fig. 3 represents a vertical section taken longitudinally through the series of fingers and leaving the cutters and their shaft in full or uncut. Figs. 4 and 5 represent the caps and finger detached from the machine, they being in perspective; and Fig. 6 represents another form of cutter which cuts in one direction only between the fingers, but which, being different from that shown in Figs. 2 and 3, will be separately applied for.

Similar letters of reference, where they are used in the several figures, denote like parts of the apparatus in all of them.

My invention consists in so making the cutters of harvesting-machines as that the turning of the shaft on which they are placed shall give them a cutting motion both ways between the gathering-fingers, or, in other words, causing the cutters to cut both ways between the fingers without reciprocating endwise the shaft or bar on which they are placed, by which means I have all the advantages of reciprocating cutters without incurring the expense of power that is required to drive such cutters; and, besides, I can more readily avoid the gumming up of the cutting apparatus, and the hanging or lodging of the cut material upon the cutting apparatus.

To enable others skilled in the art to make and use my invention, I will proceed to describe the same with reference to the drawings.

A represents the ordinary finger bar or beam, to which are secured in any proper manner the fingers B. These fingers are made in two parts, as more distinctly shown in Fig. 4, the upper part, *a*, having a groove, *b*, in its forward end, which receives a lug, *c*, on the lower part, *d*, thereof, and thus firmly holds the two parts *a d* that form the fingers at this point. The rear ends of these two parts *a d* are respectively connected to the top and bottom of the finger-beam A. The lower part, *d*, of the finger is recessed on both of its sides at *e* for the purpose of reducing its weight, where strength is not required, and both the upper and lower parts of the finger have semicircular recesses *f f* in them, so that when united or placed together said recesses shall form a circular opening, as seen in Fig. 1, through which the shaft that carries the cutters, or the cutters themselves, may pass and turn in; and around these openings are formed recesses *g*, so that the cutters may work past the sides of the fingers, and thus insure the severing of every stalk of grain or grass between the fingers. In Figs. 2 and 3 are clearly shown how the cutters pass the vertical sides of the fingers.

C, Figs. 2, 3, represents a shaft, which has its bearings or supports in each of the fingers B; or it may have its supports in suitable boxes at its ends, or be supported in both the boxes and fingers. This shaft has given to it a rotary motion by any of the ordinary gear-connections with the drive-wheel of the machine. On the shaft C, and between each pair of fingers, is placed in an oblique manner a series of cutting-disks, D, which may be of a parobolic form, and have regularly-curved perimeters; or their perimeters may be waved or indented. These disks are made of flat steel plates, and have one-half of their perimeter beveled off and sickled or nicked on one side, and the other or opposite half beveled and sickled on the opposite side thereof, in a similar manner, as seen at *h*, Fig. 2. They are fastened to the shaft in this oblique manner by means of oblique-surfaced washers between them, and the whole held in place by a nut, *i*, and screw *j* at the end of the shaft, so that they can be readily removed for repairs when needed. Every revolution of the shaft C causes each of these cutting-disks to make a cutting-stroke from right to left and from left to right between its respective fingers, and as their edges pass into the recesses *g* they cut off every stalk of grain or grass between them. Over these cutters and over the fingers a cap or shield, E, is placed, which may be adjustable or otherwise, for the purpose of allowing the cut grain or grass to pass over freely, without lodging on the cutters, the fingers or the finger-bar; and this cap or shield E may be set so close to the cutting-edges of the disks D as to form a sort of shear-edge for said disks to cut against, and thus relieve itself of the grass or gummy matter that may cling to them, or, in other words, to act as a clearer for the cutters. Instead of having this cap or shield separate and adjustable, it may be cast or wrought onto the upper part, a, of the finger, as seen in Fig. 5, and have beveled edges n n thereon, so that when the series of fingers are arranged on the finger-beam they shall form their own cap or shield.

I prefer to incline the disks D in opposite directions, so that one half of them shall be cutting from right to left at the same time that the other half are cutting from left to right between their respective fingers, one portion of them counteracting the tendency of the other portion to push the machine from the resisting stalks that are to be cut, and thus preventing any side motion of the machine.

In Fig. 6 I have represented another form of cutter, which differs from that shown in Figs. 2 and 3, inasmuch as, instead of cutting from right to left and from left to right between the fingers at each revolution of the shaft, it cuts in one continuous direction, it being in reality, a simple screw, while the disks, as shown in Figs. 2, 3, are sections of a double-threaded reversed screw; but as the form of cutter shown in Fig. 6 will be made the subject-matter of a separate application for Letters Patent it is superfluous here to further describe it than merely to point out its difference. In this modification the journals of the cutters are at the ends, as at k, and the cutting-edges m are double continuous spiral threads, running from end to end of the platform or finger-beam.

The operation of this cutter is to cut the grain or grass between the fingers through which it passes in one continuous direction, or whichever way the screw may run. The edges m of this cutter may be sickled or plain, as may be preferred, and instead of said edges maintaining their true spiral form they may be indented, waved, or irregular.

I have mentioned the disks D as being of a parabolic form. I do not of course confine myself to that specified form, as they may be circular; but so long as cutting-edges are obliquely placed on both sides of a shaft, so that a single rotation of said shaft shall produce a double cut between the fingers, I should deem it as being involved in my invention. When the cutter as shown in Fig. 6 is used, then of course the openings in the fingers must be large enough to admit its greatest diameter; but the recesses as shown at g need only be made in the extreme fingers, so that the extreme ends r of said cutters may extend therein to enable it to have something to work against in cutting up and clearing itself of the usual clogging matter; and so with the recesses when the disks are used, unless they have something to work against, or to hold the wiregrass and other clogging material, and prevent it from slipping or passing around and eventually winding itself around the moving parts, they cannot cut or clear themselves properly.

The guard or shield E prevents the cut grain or grass from being drawn in behind the cutters, which would clog them, or require them to cut said grain or grass off twice, and effectually protects the cutters from clogging.

Having thus fully described the nature and object of my invention, what I claim therein as new, and desire to secure by Letters Patent, is—

1. Causing a series of cutters to cut from right to left and from left to right between each pair or set of fingers at every single revolution of said series of cutters upon their shaft or journals, substantially as described.

2. In combination with such series of cutters, the recesses g in the sides of the fingers, into which they may enter to enable them to clear themselves from the clogging matter that gathers and accumulates (unless somehow prevented) in all harvesting-machines, as herein set forth.

JOHN P. MANNY.

Witnesses:
J. G. MANLOVE,
HOBART H. HATCH.